PUMP STORAGE GRINDER

Original Filed April 9, 1970 2 Sheets-Sheet 1

INVENTOR
RICHARD C. GRACE

BY Charles W. Helzer
ATTORNEY

PUMP STORAGE GRINDER

Original Filed April 9, 1970 2 Sheets-Sheet 2

INVENTOR
RICHARD C. GRACE

BY Charles W. Helzer
ATTORNEY

United States Patent Office

Re. 28,104
Reissued Aug. 6, 1974

28,104
PUMP STORAGE GRINDER

Richard C. Grace, Carlisle, N.Y., assignor to Environment/One Corporation, Latham, N.Y.

Original No. 3,667,692, dated June 6, 1972, Ser. No. 26,925, Apr. 9, 1970. Application for reissue Mar. 7, 1973, Ser. No. 338,952
Int. Cl. B02c *13/18*
U.S. Cl. 241—36 35 Claims

Matter enclosed in heavy brackets [ ] appears in the original patent but forms no part of this reissue specification; matter printed in italics indicates the additions made by reissue.

ABSTRACT OF THE DISCLOSURE

The pump storage grinder employs a tank having a sewage inlet and a removable top cover supporting a depending sealed housing having a motor and motor controls for driving a grinder or comminutor and pump externally of the chamber by means of a common motor shaft. The chamber is formed by a control housing integral with the cover, a tube and pump head, all held together by means of tension bolts secured between the pump head and cover. The motor shaft extends through the pump head to drive a resilient helical pump and a comminutor impeller disc with depending blades that cooperate with a comminutor ring held between a comminutor inlet shroud and a pump housing secured to the pump head. A pump discharge chamber is provided in the head with a one-way valved passage leading to a discharge conduit extending through the cover. The level responsive motor control is provided with a liquid pressure sensing tube extending through the chamber in communication with a depending pipe secured to the pump head and housing.

BACKGROUND OF THE INVENTION

Sewage handling systems are known wherein sewage is pumped upwardly to a gravity feed pipe as in a lift station or through pressure pipes leading to a disposal site independently of ground elevation. Sewage pumps and sewage grinders are known, but there is a need for a compact sewage holding or storage device that will periodically pump sewage with a high pressure according to automatic operation, and which will be economical to mass produce and operate over long periods of time without servicing.

SUMMARY OF THE INVENTION

It is an object of the present invention to provide a pump storage grinder for pressurized sewage system or the like, which will meet the above-mentioned needs.

According to the present invention, a sewage holding and storage tank has an inlet and a separate cover, with the cover supporting a depending sewage grinder-pump unit. A control housing is integral with the cover and together with a motor containing tube and pump head having packing and motor shaft bearings form a sealed chamber. The control housing, tube and pump head are telescopically engaged and drawn together by means of tension bolts extended between the cover and pump head. A small cover plate will provide access to the sealed chamber without requiring the removal of the main cover.

A one-piece pump housing or casing is secured directly to the pump head and contains therein a resilient helical pump driven by the motor shaft. An inlet shroud for the comminutor is directly secured to the lower end of the pump housing to clamp a comminutor ring between opposed shoulders of the pump housing and inlet shroud. An imperforate impeller disk with opposed blades is mounted on the terminal lower end of the motor shaft to cooperate with the comminutor ring.

The pump head is provided with a discharge chamber having a radial discharge passage leading to a discharge conduit extending through the cover. A one-way valve is clamped between the pump head and discharge conduit to prevent backflow of sewage into the holding tank.

Automatic operation of the pump-grinder is obtained by means of motor controls having a pressure sensing passage opening adjacent the inlet shroud to sense the liquid head at this point and thus the terminal liquid level within the holding tank.

BRIEF DESCRIPTION OF THE DRAWINGS

Further objects, features and advantages of the present invention will become more clear from the following detailed description of the drawing, wherein.

DETAILED DESCRIPTION OF THE DRAWINGS

Figure 1:
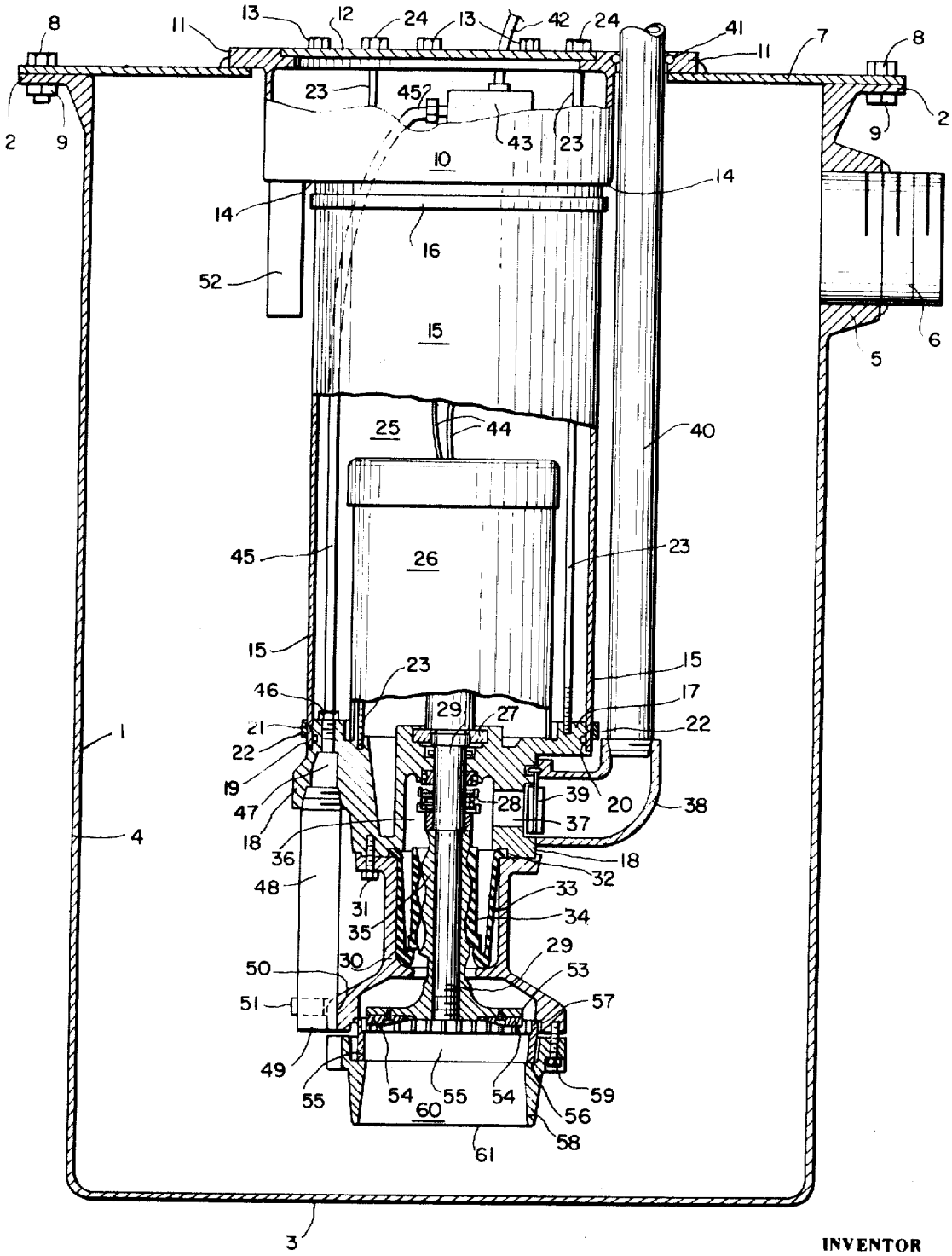
FIG. 1 is a cross-sectional view taken on a vertical plane extending through the central axis of a pump storage grinder employing the features of the present invention.

The pump storage grinder of FIG. 1 includes a single piece upwardly opening cup-shaped receptacle 1, which may be metallic, having an outwardly extending peripheral flange 2 at its open end, a bottom 3, a substantially cylindrical side wall 4, and boss 5 having an inlet pipe 6 welded or otherwise rigidly secured thereto. The inlet pipe 6 is provided with a coupling at its outer end, which may be threaded, for connection to a pressurized or gravity sewage line for discharge of sewage directly into the receptacle. An annular cover 7 is sealingly clamped to the flange 2, with the inter-position of an annular gasket (not shown in detail) by means of a plurality of peripherally spaced bolts 8 extending through aligned holes in the cover 7 and flange 2, which bolts 8 have nuts 9 threaded thereon.

As an integral part of the cover 7, a one-piece motor control housing 10 is welded at its peripheral outwardly extending flange 11 to form a rigid unit. A small removable cover plate 12 is releasably secured by means of conventional fasteners 13 to the inner periphery of the annular cover 7.

The depending motor control housing 10 has a downwardly facing annular shoulder 14 in abutting engagement with a cylindrical tube 15 telescopically received on a depending cylindrical coupling portion (not shown) of the control housing 10, the details of which are identical to the later described coupling for the lower end of tube 15. A tension band 16 provides sealing clamping pressure to this telescopic coupling.

The other end of the tube 15 is telescopically received on a cylindrical coupling portion 17 of a pump head 18 for abutting engagement with an upwardly facing annular shoulder 19 of the pump head 18. An O-ring seal 20 is provided between the coupling portion 17 and the adjacent internal surface of the tube 15. To further assure a sealing coupling, the coupling portion 17 is provided with a triangular cross-section ridge 21, which will bite into the adjacent internal surface of the tube 15; preferably, the tube 15 is constructed of a synthetic material, for example, a polymer. The seal caused by the ridge 21 is assured by a constricted band 22. The sealing structure 17, 19, 20, 21, 22 is a mirror image of the above-described sealing structure including elements 14, 16.

The weight of and forces transmitted to the pump head 18 are carried by a plurality of tension bolts 23 threaded or otherwise secured at their lower end to the pump head 18 and at their upper end to the flange 11 of the cover 7 by means of nut heads 24. Because of this structure, the tube 15 is needed only for sealing purposes and may therefore be of a relatively weak, light and inexpensive structure. In this manner, the cover 7, control housing 10, cover plate 12, tube 15, and pump head 18 form a sealed chamber 25 for housing therein a motor and motor controls as will hereinafter be described in more detail.

To drive the pump and comminutor or grinder, there is provided a motor 26, of conventional commercially obtained structure supportingly mounted to the upper surface of the pump head 18. The left hand shown tension bolt 23 extends outside of the motor casing and its lower portion appears in FIG. 1 for purposes of illustration only by a deviation of the cross-section line and cutting away the lower portion of the motor 26. A conventional bearing 27 and sealing means or packing 28 mounts the motor shaft 29 in the pump head 18 to complete the seal for the chamber 25.

The pump includes a one-piece metallic pump housing or casing rigidly secured directly to the bottom of the one-piece pump head by means of bolt type fasteners 31. A mounting flange 32 for the resilient pump casing is peripherally clamped between opposed shoulders of the pump head 18 and pump housing 30. An outer annular wall 33 of the resilient casing depends from the flange 32 and at its terminal end is integrally connected with an inner casing wall 34, which elements 32, 33, and 34 are constructed in one piece of rubber or other resilient material. The internal surface of the inner wall 34 is provided with a helical thread or groove that cooperates with helically threaded member 35 carried by the motor shaft 29 to form a helical pump in a known manner.

The pump discharges fluid upwardly into an annular discharge chamber 36 formed in the pump head 18 around the motor shaft 29 externally of the sealed chamber 25. A radially extending discharge port 37 leads from the discharge chamber 36 to a discharge elbow 38 that is suitably and releasably secured to the pump head 18 with the mounting portion of a one-way flapper valve 39 clamped therebetween. The flapper valve 39 is the same as that disclosed in *Patent No. 3,664,775* [application Ser. No. 573, "PSG-02] "Check Valve," filed Jan. 5, 1970, *issued May 23, 1972*, of common assignee, the disclosure of which is incorporated herein in its entirety by reference. A vertically extending pipe 40 passes upwardly through the cover 7 with the inter-position of a sealing O-ring 41. The pipe 40 and elbow 38 together form a discharge conduit.

Power for the motor 26 is obtained from an input wire 42 that extends through the cover 7 to a motor control 43, which will actuate the motor 26 through wires 44 in response to the attainment of a predetermined level of fluid within the receptacle 1. The motor control 43 is supported on a suitable shoulder (not shown) provided on the inside of the motor control housing 10. To sense the fluid level within the receptacle 1, the motor control 43 is provided with a flexible pipe 45 extending downwardly through the sealed chamber 25 to where it is sealingly attached by means of a threaded pipe coupling 46 to a passage 47 formed in the pump head 18, which passage 47 is threaded to receive a vertically extending pipe 48 that opens at 49 substantially flush with the lower edge of the pump housing 30. The lower end of the pipe 48 is secured to the lower end of the pump housing 30 by means of an outwardly opening and axially extending slot 50 in the side wall of pump housing 30 and a clamping band 51 secured at its terminal ends to the pump housing 30.

For venting the receptacle 1 to the atmosphere, the control housing 10, preferably a casting, is formed with a depending pipe 52 that provides a fluid passage opening at one end to the inside of the receptacle 1 and its opposite end above the cover 7. The passage formed within pipe 52 is not in communication with the sealed chamber 25. *Alternatively, the tank 1 may be vented to atmosphere through the inlet pipe 6 under conditions where the inlet pipe 6 is connected to the gravity drain of a dwelling having a normally installed vent to atmosphere.*

The comminutor of the present invention employs an imperforate impeller disk 53 drivingly secured to the lower terminal end of the motor shaft 29. At least two diametrically opposed impeller blades 54 are secured to the downwardly facing surface of the disk 53 to pick up and impell fluid radially outwardly as the shaft 29 rotates. An impeller stator or ring 55 is clampingly received between opposed shoulders 56 and 57 of an annular inlet shroud 58 and the pump housing 30, respectively. The one-piece metallic inlet shroud 58 is directly secured to the lower end of the pump housing 30 by means of a plurality of peripherally spaced bolt type fasteners 59. The inlet shroud 58 has a continuously smooth internal surface 60 that extends completely around the exposed inside of the shroud from the lowermost terminal edge 61 upwardly and inwardly to the shoulder 56.

Figure 2:
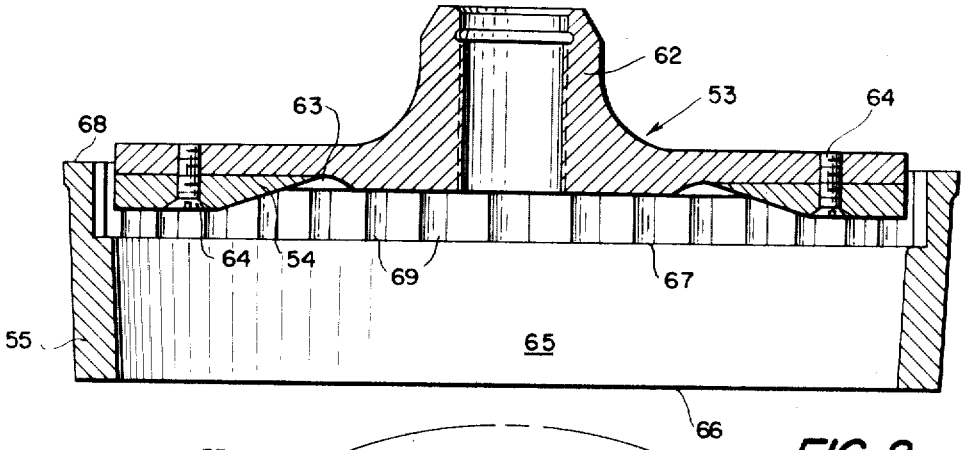
FIG. 2 is an enlarged cross-sectional view of the impeller and comminuting ring as they are shown in FIG. 1.
Figure 3:
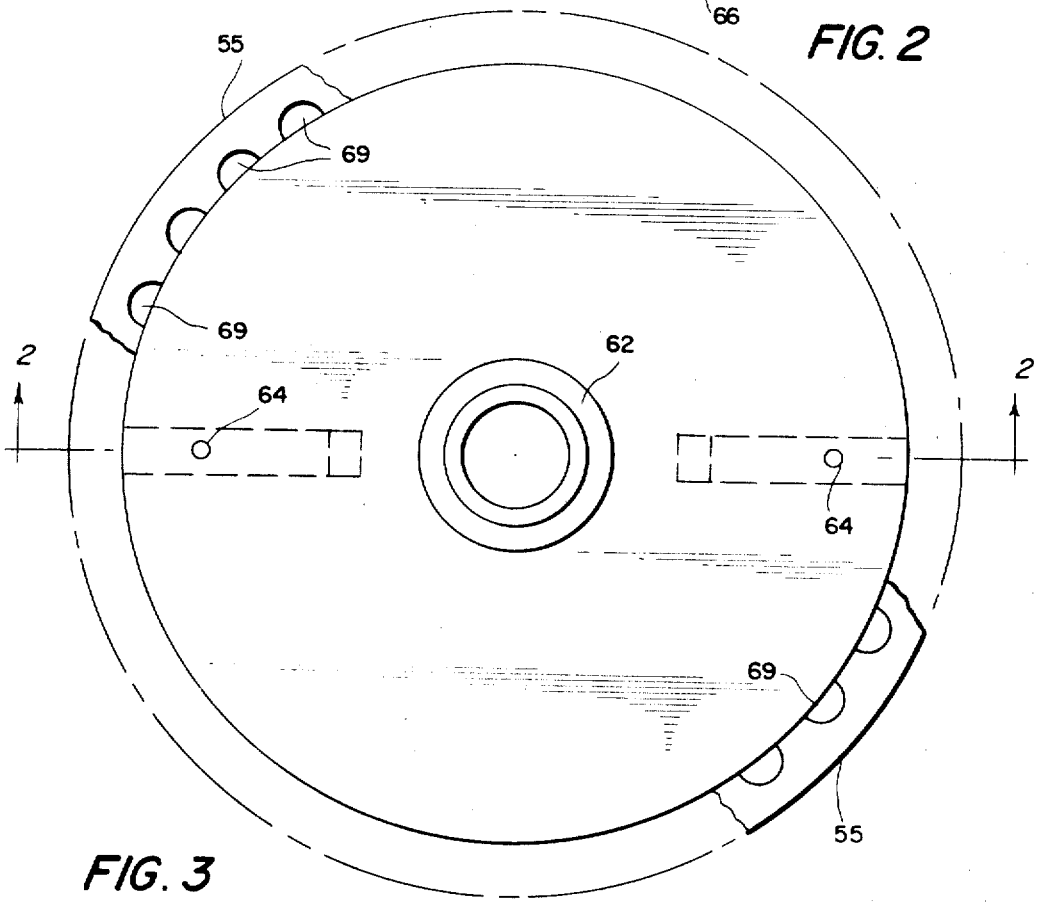
FIG. 3 is a top plan view of FIG. 2, with line 2—2 showing where the cross-section of FIG. 2 would be taken with respect to the structure of FIG. 3.

As shown more clearly in FIG. 2, the impeller disk 53 is provided with a hub 62 to rigidly secure it to the impeller shaft. The impeller blades 54 are respectively mounted with radially extending slots 63 by means of headed screw fasteners 64. As a variation, the blades 54 may be formed in one piece with the impeller disk 53 by casting or they may be integrally attached by welding or the like. As seen, the outer terminal edge of each blade 54 is axially flush with the periphery of the impeller disk 53.

The comminutor ring 55 has a continuously smooth internal surface 65, which as shown in FIG. 1 substantially forms a continuation of the shroud surface 60. The surface 65 continuously extends from the lower terminal edge 66 upwardly and tapered outwardly to a transition line 67. Upwardly from the transition line 67 to the upper terminal edge 68 of the ring 55, there is formed a cutting surface consisting of a plurality of peripherally uniformly spaced axially extending semi-circular cross section slots 69, which cooperate with the rotating blades 54 to comminute sewage material passing therebetween. From FIG. 2, it is seen that the slots 69 extend from below the blades 54 upwardly past the blades to approximately the midpoint of the adjacent periphery of the disk 53. Also, it is seen that the internal surface of the ring 55, including the surface 65 and cutting surface having the slots 69 extends outwardly [or] *and* is substantially axially aligned with the periphery of the disk 53, that is, there is no inward overlapping that would tend to catch woven material or the like. With this construction, any solid material or woven fabric material would be picked up by the blades 54 and freely rejected downwardly if it could not pass between the impeller disk 53 and ring 55. Thereafter, the rejected material would again be sucked upwardly for additional rejections until it is either completely passed upwardly to the pump or reduced in size until it falls to an inaccessible portion of the bottom 3 of the container 1. Thus, the comminutor will not clog.

Since the operation of the pump storage grinder has been described along with its specific structure, there will be no specific discussion of the operation, which has been fully disclosed above. Further variations, modifications and embodiments are contemplated according to the broader aspects of the present invention and the specifically described structure is that of a preferred embodiment and there is no intention to be expressly limited thereto.

It is important that the load created by the submerged cutter elements of the comminutor moving water and refuse be kept to a minimum. If not, the result can be an over-sized motor adding cost, over-heating of the motor, or such a large current drain that it cannot be handled by conventional home branch circuit. The cutter bars or blades must be kept to a minimum height below the level of the impeller disk to keep this load low. On the other hand, it has been found that the cutter blades cannot be reduced below a certain minimum or the characteristic swirling action created by the impellers ceases and there are no currents attending to draw materials into the cutter. This is particularly critical with the impeller of the present invention that is imperforate and has material sucked upwardly around it. Experience has shown the optimum height of the cutter bars, as measured in the vertical direction of FIG. 1 parallel with the axis of shaft 29, below the adjacent plane surface of the impeller disk to be between 0.200 and 0.250 inch as the best compromise between low load and adequate swirling action. With the construction of FIG. 2 where the cutter blades 54 extend into slots formed in the cutter disk, the above-mentioned critical height would be the actual height of the cutter blades minus the depth or height of the slots 63, that is, the net height of the cutter blades. As a specific example, each cutter blade would have an overall height of 0.138 to 0.313 inch, a radial extent from the center line of the screw 64 to the outer edge of 0.509 to 0.505 inch, an overall radial extent of 1.258 to 1.250 inches, a circumferential width of 0.375 to 0.372 inch, and its bevelled surface extending at approximately 15° to the radial direction. As a specific illustration of the dimensions for the impeller disk, the disk would have a diameter of between 5.69 to 5.61 inches, a disk height (excluding the hub) of 0.527 to 0.463 inch with the depth of the slot 63 being between 0.097 and 0.093 inch. According to the more specific form of the invention, the above-mentioned height range for the extent of the cutter blades downwardly from the adjacent lowermost point of surface of the impeller disk being between 0.200 and 0.250 inch is critical; the above-mentioned specific examples being within this range and being a preferred embodiment. Also, it has been found that the cutter bars must be essentially flush with the edge of the impeller disk for optimum performance. If the cutter bars or blades project over the edge of the disk items such as cloth and plastic tend to wrap around the cutter blade causing objectionable load and vibration and very slow processing of the items. If the bars are recessed back from the edge of the disk, grinding does not occur. Also, for the optimum rejecting and reprocessing of hard materials such as metal, or non-metallic flexible items such as cloth or plastic, it is critical that the grinding mechanism be mounted in the inverted position, that is, that the inlet for the comminutor face downwardly. The above-mentioned items would plug the grinder if the grinder were not in the inverted position, or at the least greatly reduce its efficiency.

I claim:

1. Apparatus for comminuting and pumping semifluid material, comprising: a single piece upwardly opening cup-shaped receptacle [having an outwardly extending peripheral flange at its open end provided with a plurality of flange holes extending in the axial direction of the receptable]; an inlet pipe extending through said receptacle, freely opening into the interior of said receptacle and having a coupling exteriorly of said receptacle; a single piece annular cover *having an opening therein and* peripherally overlying said receptacle [flange and having holes axially aligned with said flange holes; an annular gasket between said flange and said annular cover]; fastener means [extending through said aligned holes to clamp] *fastening* said annular cover and said [flange] *receptacle* sealingly together; a one-piece generally [annular] *cylindrical* control housing having an annular outer flange peripherally overlapping the inside of *the opening in* said annular cover and further having a depending annular wall extending into said receptacle; an outlet pipe extending through one of said control housing annular flange and said annular cover; a cover plate releasably secured to and closing the upper end of said control housing; said control housing having a downwardly extending cylindrical coupling portion and a downwardly facing shoulder; a *fluid tight* tube having an upper end abutting against said shoulder and telescopically engaging said cylindrical coupling portion; seal means between said tube and said cylindrical coupling portion; band means surrounding and clamping said tube radially tightly against said cylindrical coupling portion; a one-piece generally annular head telescopically engaging at its upper end with the lower end of said tube and having sealing means therebetween; a plurality of bolt means, each engaging said control housing at one of its ends and engaging said head at its other end for tightly clamping said tube between said head and said control housing; an electric motor within said tube and having a rotatable shaft extending vertically downwardly and through said head; bearing means rotatably receiving said shaft and mounting said motor on said head; sealing means for preventing the passage of fluid upwardly through said head into said tube; said cover plate, said control housing, said tube, said head, said motor shaft, and said sealing means forming a sealed motor and control chamber within said receptacle; an outlet passage extending [radially] through said head portion exteriorly of said sealed motor and control chamber; conduit means extending between said outlet passage and said outlet pipe; [one-way valve means clamped directly between said conduit means and said head for allowing fluid flow only outwardly from said head;] a one-piece annular pump housing rigidly secured to the lower end of said head and having said motor shaft extending axially therethrough; a resilient internally helically threaded annular pump casing [clamped between] *secured relative to* said pump housing and said head; helical thread means drivingly on said motor shaft within said pump casing for cooperation therewith during rotation of said motor shaft to form means for pumping fluid upwardly through said pump housing portion, into said head, through said outlet passage, [through said one-way valve means] through said conduit means, and outwardly through *the* outlet pipe; said pump housing having an annular lower *enlarged* impeller casing portion; *a substantially* [an] imperforate impeller disc drivingly secured to said motor shaft below said pumping means and within said impeller casing; an annular inlet shroud having a lower [continuously smooth] internal peripheral wall being rigidly secured below and to said pump housing; a comminuting ring tightly [clamped] *secured* [between] *relative to* said pump housing and said inlet shroud; said comminuting ring having an inner annular wall substantially axially aligned with the periphery of said impeller disc; said inner annular wall [consisting essentially of] *comprising* a [lower continuously smooth wall portion and a second upper] comminuting wall portion composed of a plurality of peripherally arranged axial comminuting slots; a plurality of impeller blades on the lower face of said impeller disc extending downwardly and generally radially aligned with said comminuting slots; said comminuting slots extending from a distance substantially below said impeller blades axially upwardly for a distance substantially above said impeller blades; pressure actuated control means for starting and stopping said motor and being contained within said control housing; *and* sealed conduit means extending from said pressure actuated control means downwardly and opening adjacent said inlet shroud, but upwardly from the lower terminal edge of said inlet shroud so that fluid sucked in by said pumping means will have an axial velocity component away from said conduit means opening for preventing clogging[; and a fluid vent pipe extending through said control housing portion to provide free air passage from the upper portion of said receptacle to the exterior of said receptacle].

2. Apparatus for comminuting and pumping semifluid material comprising: a tank having an [upper] [open end] *opening in the upper end thereof;* cover means releasably and sealingly mounted to the periphery of said upper [open end] *opening;* a plurality of substantially vertical tension bolts *secured to* [extending through] said cover means *and extending* downwardly into said tank for a substantial distance; a comminutor, a pump, and a motor directly driving said comminutor and pump being arranged such that fluid is pumped upwardly through said comminutor from said tank and then through said pump; chamber means [extending from said upper open end downwardly into] *supported by said tension bolts within* said tank and sealingly containing therein said motor, said motor being mounted upwardly from the lower terminal end of said tension bolts; the terminal lower end of said *tension* bolts being secured to said chamber means for carrying *substantially* the entire [weight] *load* of said chamber means, motor, pump and [comminuting] *comminutor* [in tension] from said cover.

3. The apparatus of claim 2, including motor *control* means carried in the upper portion of said chamber means for actuating said motor in response to the level of fluid within said tank; *said cover means including additional removable cover means for providing ready access to the motor control means.*

4. The apparatus of claim [3] *2* wherein said cover means is [annular; and] a cover plant [being] releasably and sealingly mounted [within said annular cover means to provide access to said motor controls and together with said annular cover means completely sealing the upper end of] *over the opening in* said tank *for ready removal of said chamber means, motor, pump and comminutor as an integral unit.*

5. The apparatus of claim 2, wherein said tank [is of a one-piece construction with] *includes* a bottom wall, a substantially cylindrical side wall portion, and an [outwardly extending] *open* upper [flange] *end*; said cover means being releasably secured to said *open* upper [flange] *end*; and an inlet pipe sealingly extending through said side wall *portion* and having an outer coupling end and a free inner end for discharging directly into said tank.

6. The apparatus of claim [2] *4* including an outlet pipe sealingly extending through said cover [means] *plate*; and said pump having a discharge directly fluid connected to said outlet pipe *and said outlet pipe being readily removable with said cover plate, chamber, means, motor, pump and comminutor as an integral unit.*

7. The apparatus of claim 6 wherein said pump includes a one-piece pump head [having] *providing* said discharge; *and* said outlet pipe *is* [being] directly secured to said pump head [; and including a resilient flapper one way valve clampingly secured directly between said outlet pipe and said pump head].

8. The apparatus of claim 2, wherein said pump includes a one-piece pump head forming the lower portion of said chamber means; said motor being mounted directly on the upper end of said pump head and having a shaft extending vertically downwardly through said pump head; and bearing and packing means being operatively mounted between said pump head and said motor shaft.

9. The apparatus of claim 8, wherein said pump includes an outer one-piece casing being directly releasably secured to and below said pump head.

10. The apparatus of claim 9, wherein said pump includes a pump impeller secured to [the periphery of] said motor shaft within said pump casing; and said comminutor including [an] *a substantially* imperforate impeller disk secured to the terminal lower end of said motor shaft, a comminutor ring operatively surrounding said impeller disk, [and] a one-piece inlet shroud releasably secured directly to the *enlarged suction inlet portion formed on the* lower end of said pump casing with said comminutor ring [clampingly retained] *secured* [between] *relative to* said inlet shroud and said pumping casing[.], *and at least one rigid, inflexible impeller cutter blade mounted on the under surface of the impeller disk.*

11. A grinder-pump unit comprising: a motor having a *generally* vertical axis of rotation; [vertically] downwardly extending motor drive shaft means; a hollow pump head below said motor and surrounding said motor shaft means; bearing and packing means supportingly and sealingly connected to said shaft means between said pump head hollow interior and said motor; a pump casing extending below and secured directly to said pump head *and having an enlarged suction inlet portion formed on the lower end thereof*; a comminutor inlet shroud extending below and directly secured to *the enlarged suction inlet portion on the lower end of* said pump casing; pump means extending between said motor shaft means and said pump casing; comminutor impeller means secured to *the* lower [terminal] end of said motor shaft means below said pump means *and having at least one impeller blade secured to the lower surface thereof;* stationarily mounted cooperating comminutor stator means secured between said pump casing and said inlet shroud; *said comminutor impeller means and said comminutor stator means forming a substantially uninterrupted straight through axial path through said comminutor shroud into the enlarged suction inlet portion of said pump casing;* said pump head including an annular discharge chamber surrounding said motor shaft means upwardly of said pump means and said pump casing, and an outlet passage [radially] extending through said pump head above said pump casing into said annular discharge chamber; said pump means being a helical pump having a resilient material relatively fixed portion comprising an outwardly extending mounting flange [clampingly] secured [directly between] *relative to* said pump head and said pump casing, an outer annular wall integrally depending from said mounting flange and extending away from the adjacent surface of said pump casing to a lower terminal end, an inner annular wall portion integrally extending upwardly from said outer annular wall terminal end, said inner annular wall having a helical thread on its internal surface surrounding said motor shaft means; and cooperating helical thread means on said motor shaft means interengaging with said helical thread during rotation of said motor shaft means to pump fluid upwardly therebetween.

12. The apparatus of claim 11, including a discharge pipe directly and releasably secured to said pump head in fluid communication with said outlet passage [; and a resilient flapper valve clampingly sealed between said discharge pipe and said pump head for valving said discharge outlet].

13. The apparatus of claim 11, wherein said pump head is of a one-piece construction, said pump casing is of a one-piece construction and said inlet shroud is of a one-piece construction.

14. The apparatus of claim 11 wherein said comminutor impeller includes [an] *a substantially* imperforate impeller disk and at least one impeller blade secured to the lower face of said impeller disk and extending downwardly therefrom with a radially outer terminal end substantially flush with the outer periphery of said impeller disc; and said comminutor stator means is a cutter ring having an internal annular wall *comprising* [consisting essentially of a] *an* [first lower annular continuously smooth surface and a second] annular cutting surface

[of] *having* a plurality of [uniformly] peripherally spaced [identical] axially extending slots.

15. The apparatus of claim 14, wherein [said impeller blades are of substantially the same thickness as said impeller disc, as measured in the vertical direction;] said axially extending slots [extending] *extend* from below said impeller blades vertically upwardly to terminate above said impeller blades but [below] *above* the adjacent [upper] *lower* surface of said impeller disc, said cutter ring internal annular wall being outward of the periphery of said impeller disc.

16. The apparatus of claim 11, wherein said pump head has an axially extending passage; [said pump casing having at its lower end an outwardly facing slot substantially axially aligned with said pump head axially extending passage;] a *level sensing* pipe *assembly* having an upper end threadingly received in said pump head axially extending passage and a lower free end [engaging within said pump casing slot; a strap secured at one end to said pump casing on one side of said slot to extend tightly around said pipe to the other side of said slot and having its other end secured to said pump casing;] *exposed to the fluid level in said tank* and automatic control means communicating through said pipe for actuating said pump means in response to fluid level.

17. A comminutor, comprising: a one-piece annular inlet shroud having a free terminal lower end, an upwardly facing annular shoulder, and an annular internal surface extending completely from said terminal lower end to said annular shoulder; a comminutor ring having an internal diameter substantially the same as the internal diameter of said shroud internal surface and resting on said annular shoulder; a substantially annular impeller housing having a downwardly facing annular shoulder substantially aligned with said upwardly facing annular shoulder and being releasably secured to said inlet shroud for clamping therebetween said comminutor ring; a shaft extending through said impeller housing and having drive means at its upper end; a comminutor impeller drivingly secured to the lower terminal end of said shaft within said impeller housing for cooperation with said comminutor ring; said comminutor impeller including [an] *a substantially* imperforate disc having a peripheral edge closely adjacent to the inner periphery of said comminutor ring; and pump means driven by rotation of said shaft for sucking fluid upwardly through said inlet shroud and *substantially* only between said [imperforate] impeller disc and said comminutor ring.

18. The apparatus of claim 17 wherein said inlet shroud annular inlet surface is continuously smooth; and said comminutor ring includes an inner wall consisting essentially of a first [continuously smooth] annular surface substantially forming a continuation of said inlet shroud internal surface and a second upper cutter surface having a plurality of peripherally [uniformly] spaced axially extending slots.

19. The apparatus of claim 18, including at least one impeller blade mounted on the lower surface of said impeller disc and extending downwardly in radial opposition with said solts.

20. A comminutor, comprising: a one-piece annular inlet shroud having a free terminal lower end, an upwardly facing annular shoulder, and [a continuously smooth] *an* annular internal surface extending completely from said terminal lower end to said annular shoulder; a comminutor ring having an internal diameter substantially the same as the internal diameter of said shroud internal surface and resting on said annular shoulder; a substantially annular impeller housing having a downwardly facing annular shoulder substantially aligned with said upwardly facing annular shoulder and being releasably secured to said inlet shroud for [clamping] *supporting* therebetween said comminutor ring; a shaft extending through said impeller housing and having drive means at its upper end; a comminutor impeller drivingly secured to the lower terminal end of said shaft within said impeller housing for cooperation with said comminutor ring [;] , *said comminutor impeller having at least one downwardly extending element secured on the undersurface thereof for providing swirling action to fluid on which the comminutor acts;* said inlet shroud and said comminutor ring having their internal [annular] *peripheral* surfaces substantially axially aligned in the vertical direction; [and the internal surface of said inlet shroud flaring slightly radially outward from said shoulder to its terminal lower end,] and the internal surface of said [comminuting] *comminutor* ring [consisting of a first lower continuously smooth annular surface and a second upper] *comprising a* bladed *cutter surface.*

21. A sewage installation, comprising a closed tank having an upper removable cover and [an] inlet [pipe] *means* below said cover for discharging sewage directly into said tank; a sewage grinding and pumping unit [supportingly mounted only on] *supported only by* and depending from said *cover entirely within said tank, said* unit having housing means forming a substantially sealed chamber with respect to the inside of said tank; motor [and motor control] means mounted within said sealed chamber; a downwardly opening comminutor and upper pump *means* mounted externally from and below said housing *means and driven by said motor* means; and said cover including a first annular portion rigidly supporting said unit [and a second cover mounted] *for ready* removal *and servicing, and a second cover mounted on said annular portion for ready removal* to expose the interior of said sealed chamber *for servicing.*

22. The apparatus of claim 21, wherein said pump has a discharge side; and including a discharge pipe extending from the discharge side of said pump upwardly through said cover.

23. The apparatus of claim 21, wherein said tank and housing means include a free sewage area below said unit and annularly surrounding said unit from the bottom of said tank continuously upwardly the full length of said unit to said cover.

24. The apparatus of claim 21, wherein said motor includes a motor shaft extending through said housing means and having mounted directly thereon a pump impeller and a lower comminuting impeller.

25. A sewage installation, comprising a closed tank having an upper removable cover and an inlet pipe below said cover for discharging sewage directly into said tank; a sewage grinding and pumping unit [supportingly mounted only on] *supported only by* and depending from said cover entirely within said tank; said unit having housing means forming a substantially sealed chamber with respect to the inside of said tank; motor and motor control means mounted within said sealed chamber; a downwardly opening comminutor and upper pump mounted externally from and below said housing means; said housing means including a one-piece control housing integral with said cover and having therein said motor control means; said housing means further including a *fluid tight* tube telescopically engaging said control housing and depending therefrom; [and said housing means further including] a pump head telescopically engaging the lower end of said tube]*; and a second removable cover plate sealingly closing an opening in said first-mentioned cover for providing ready access to the interior of the control housing.*

26. The apparatus of claim 25, including sealing means at each of said telescopic connections and means extending between and tightly clamping said pump head and said control housing together axially with said tube interposed.

27. A sewage installation, comprising a closed tank having an upper removable cover and [an] inlet [pipe] *means* below said cover for discharging sewage directly into said tank; a sewage grinding and pumping unit [supportingly mounted only on] *supported only by* and depending from said cover entirely within said tank; said unit having housing means forming a substantially sealed chamber with respect to the inside of said tank, motor [and motor control] means mounted within said sealed chamber; a downwardly opening comminutor and upper pump mounted externally from and below said housing means *and driven by said motor means*; said comminutor including a stationary comminuting ring and a rotatably mounted impeller disc within said ring; said pump being operable to pump fluid upwardly between said impeller disc and said comminuting ring; said impeller disc being *substantially* imperforate to pumped fluid and having at least [two diametrically opposed] *one* downwardly extending impeller [blades] *blade;* [each of] said impeller [blades] *blade* having an outer edge substantially axially flush with the outer periphery of the impeller disc; said impeller disc having a lowermost at least annular planar surface extending substantially to its outer periphery and being perpendicular to the axis of rotation; [each of] *and* said impeller [blades] *blade* having a height, as measured in the axial direction, [beyond] below said impeller disc planar surface within the range of 0.200–0.250 inch.

*28. A comminutor apparatus for a sewage grinder pump of the type supported entirely within a tank and adapted to take suction upwardly through the comminutor into the pump for pressurization and discharge comprising an annular inlet shroud having an annular upper end a free terminal lower end and an annular internal surface extending from said terminal lower end to said upper end; comminutor ring means having an internal diameter substantially the same as the internal diameter of said shroud internal surface; a substantially annular impeller housing having a downwardly facing annular lower end having an annular internal surface diameter substantially the same as the internal diameter of said shroud internal surface; said downwardly facing annular lower end of said impeller housing and said annular upper end of said inlet shroud defining an annular ring housing cavity for receiving said comminutor ring means with said comminutor ring means being secured in said annular ring housing cavity and substantially forming a continuation of the shroud internal surface with the internal surface of the annular lower end of the impeller housing; a shaft extending through said impeller housing and having drive means at its upper end, a comminutor impeller drivingly secured to the lower end of said shaft within said impeller housing for cooperation with said comminutor ring means; said comminutor impeller including a substantially imperforate disc having a peripheral edge spaced closely adjacent the inner periphery of said comminutor ring means; the internal surface of the comminutor ring means comprising a serrated cutter surface cooperating with the comminutor impeller to define an essentially straight line axial path through the comminutor; and pump means driven by rotation of said shaft for sucking sewage upwardly through said inlet shroud and substantially only between said impeller disc and said comminutor ring means.*

*29. The apparatus of claim 28 wherein said comminutor ring means includes an inner wall surface closely spaced adjacent the peripheral edge of said comminutor impeller disc and comprising a cutter surface having a plurality of peripherally spaced axially extending slots.*

*30. The apparatus of claim 28 including at least one impeller blade mounted on the impeller disc with its cutter edge substantially in axial alignment with the peripheral edge of the impeller disc.*

*31. The apparatus of claim 30 wherein said at least one impeller blade has a height as measured in the axial direction, beyond said comminutor impeller disc surface on which it is mounted within the range of 0.200–0.250 inches.*

*32. A comminutor comprising a substantially annular inlet shroud having a free terminal lower end through which materials to be comminuted are introduced, an annular upper end, and an annular internal surface extending from said terminal lower end to said upper end; comminutor ring means having an internal diameter substantially the same as the internal diameter of said shroud internal surface, a substantially annular impeller housing having a downwardly facing annular lower end with an annular internal surface diameter substantially the same as the internal diameter of said shroud internal surface; said downwardly facing annular lower end of said impeller housing and said annular upper end of said inlet shroud defining a comminutor ring housing cavity for receiving said comminutor ring means with said comminutor ring means being secured in said comminutor ring housing and substantially forming a continuation of the shroud internal surface with the internal surface of the annular lower end of the impeller housing; a shaft extending through said impeller housing and having drive means at its upper end, a comminutor impeller drivingly secured to the lower end of said shaft within said impeller housing and having a peripheral edge spaced closely adjacent the internal periphery of said comminutor ring; and the internal surface of the comminutor ring means comprising a serrated cutter edge cooperating with the comminutor impeller to define an essentially uninterrupted straight line axial path through the comminutor, said comminutor ring means including an inner wall surface closely spaced adjacent the peripheral edge of said comminutor impeller and consisting essentially of a cutter surface having a plurality of peripherally spaced axially extending slots, and at least one rigid, inflexible impeller blade mounted on the under surface of the comminutor impeller with its cutter edge substantially in axial alignment with the peripheral edge of the comminutor impeller and extending in radial opposition to the axially extending slots in said comminutor ring means inner wall surface.*

*33. The comminutor of claim 32 wherein said at least one impeller blade has a height as measured in the axial direction, beyond said comminutor impeller surface on which it is mounted within the range of 0.200–0.250 inches.*

*34. A grinder pump core unit comprising: a motor having a generally vertical axis of rotation and downwardly extending motor drive shaft means; a hollow pump head below said motor surrounding said motor drive shaft means; bearing and sealing means supportingly and sealingly connected to said shaft means between said pump head hollow interior and said motor; a pump casing extending below and secured directly to said pump head; a comminutor inlet shroud extending below and directly secured to said pump casing; pump means extending between said motor shaft means and said pump casing; a comminutor impeller secured to the lower end of said motor shaft means below said pump means; stationarily mounted cooperating comminutor stator means supported intermediate said pump casing and said inlet shroud; said pump head including an annular discharge chamber surrounding said motor shaft means upwardly of said pump means and said pumping casing, and an outlet passage extending through said pump head above said pump casing into said annular discharge chamber; said pump means being a semi-positive displacement pump of the type having a helically threaded internal boot interengaging and cooperating with helically threaded means on said motor drive shaft means during rotation of said motor drive shaft means to suck fluid upwardly through the comminutor inlet shroud past the comminutor impeller and to pump fluid under pressure into said annular discharge chamber; said comminutor impeller having a peripheral edge surface spaced closely adjacent the internal periphery surface of said comminutor stator means with the two spaced-apart and confronting surfaces defining an essentially uninterrupted straight line axial path through the comminutor into the pump casing; and at least one rigid, inflexible impeller blade mounted on the under surface of said comminutor impeller means with its cutter edge substantially in axial alignment with the peripheral edge of the comminutor impeller.*

*35. A grinder pump core unit according to claim 34 wherein said comminutor impeller comprises a substantially imperforate rotatable disc having at least one impeller blade mounted on the under surface thereof, with the cutter edge of the cutter blade substantially in axial alignment with the peripheral edge of the comminutor impeller disc, said at least one impeller blade having a height as measured in the axial direction below the under surface of said comminutor impeller surface within the range of 0.200–0.250 inches.*

References Cited

The following references, cited by the Examiner, are of record in the patented file of this patent or the original patent.

UNITED STATES PATENTS

| | | | |
|---|---|---|---|
| 2,370,590 | 2/1945 | Taylor | 417—424 X |
| 2,464,936 | 3/1949 | McConaghy | 417—424 |
| 2,682,376 | 6/1954 | Frank | 241—257 G |
| 2,691,347 | 10/1954 | Zimmer, Jr. | 418—48 |
| 2,826,152 | 3/1958 | Michie | 418—48 |
| 3,318,248 | 5/1967 | Rembold | 241—36 |
| 3,369,715 | 2/1968 | Carter | 417—424 X |
| 3,556,677 | 1/1971 | Tremain | 417—424 X |
| 2,918,876 | 12/1959 | Howe | 241—46.17 X |

GRANVILLE Y. CUSTER, JR., Primary Examiner

U.S. Cl. X.R.

241—46.02, 258